United States Patent

[11] 3,533,349

| [72] | Inventor | Gunter Schmidt |
| | | Marina Del Rey, California |
| [21] | Appl. No. | 720,960 |
| [22] | Filed | April 12, 1968 |
| [45] | Patented | Oct. 13, 1970 |
| [73] | Assignee | Houston Fearless Corporation |
| | | Los Angeles, California |
| | | a corporation of California |

[54] ROLL FILM PROCESSOR
12 Claims, 9 Drawing Figs.

[52] U.S. Cl.................................................. 95/94,
95/90.5, 242/55.01
[51] Int. Cl................................................ G03d 3/12
[50] Field of Search............................. 95/94, 90.5;
242/55.12(S), 55.13(TXR), 55.01

[56] References Cited
UNITED STATES PATENTS

| 1,690,616 | 11/1928 | Capstaff....................... | 95/94 |
| 2,102,843 | 12/1937 | Gwynne ....................... | 242/55.01 |
| 2,186,637 | 1/1940 | Green et al. ................. | 95/94 |
| 2,385,681 | 9/1945 | Brick............................ | 95/94 |
| 2,733,645 | 2/1956 | Rose et al. ................... | 95/90.5X |
| 3,087,405 | 4/1963 | Sachs et al. .................. | 95/94(MISC) |
| 3,311,313 | 3/1967 | Rayfield ....................... | 242/55.12(S) |

*Primary Examiner*—Norton Ansher
*Assistant Examiner*—Richard L. Moses
*Attorney*—Samuel Lindenberg and Arthur Freilich ABSTRACT: Apparatus for processing a length of photographic film without requiring that the trailing end thereof be detached from a film magazine. The apparatus includes a drive train which moves the film from the magazine through various processing stages and then rewinds the film back into the magazine. In operation, the front leader is pulled from the magazine across a plurality of open tanks and coupled to a takeup reel. A series of pokers then successively descend on the pulled out leader to form loops therein which are carried into the solution tanks. The rest of the film is then drawn from the magazine following the path through the tanks. Once the film has been fully pulled through the tanks, except for part of the trailing leader which is still within the magazine, the pokers are withdrawn and the film is rewound. Protective umbrellas are provided to keep the film dry during rewind.

Patented Oct. 13, 1970

INVENTOR.
GUNTER SCHMIDT
BY Lindenberg + Freilich

ATTORNEYS

INVENTOR.
GUNTER SCHMIDT
BY Lindenberg + Freilich
ATTORNEYS

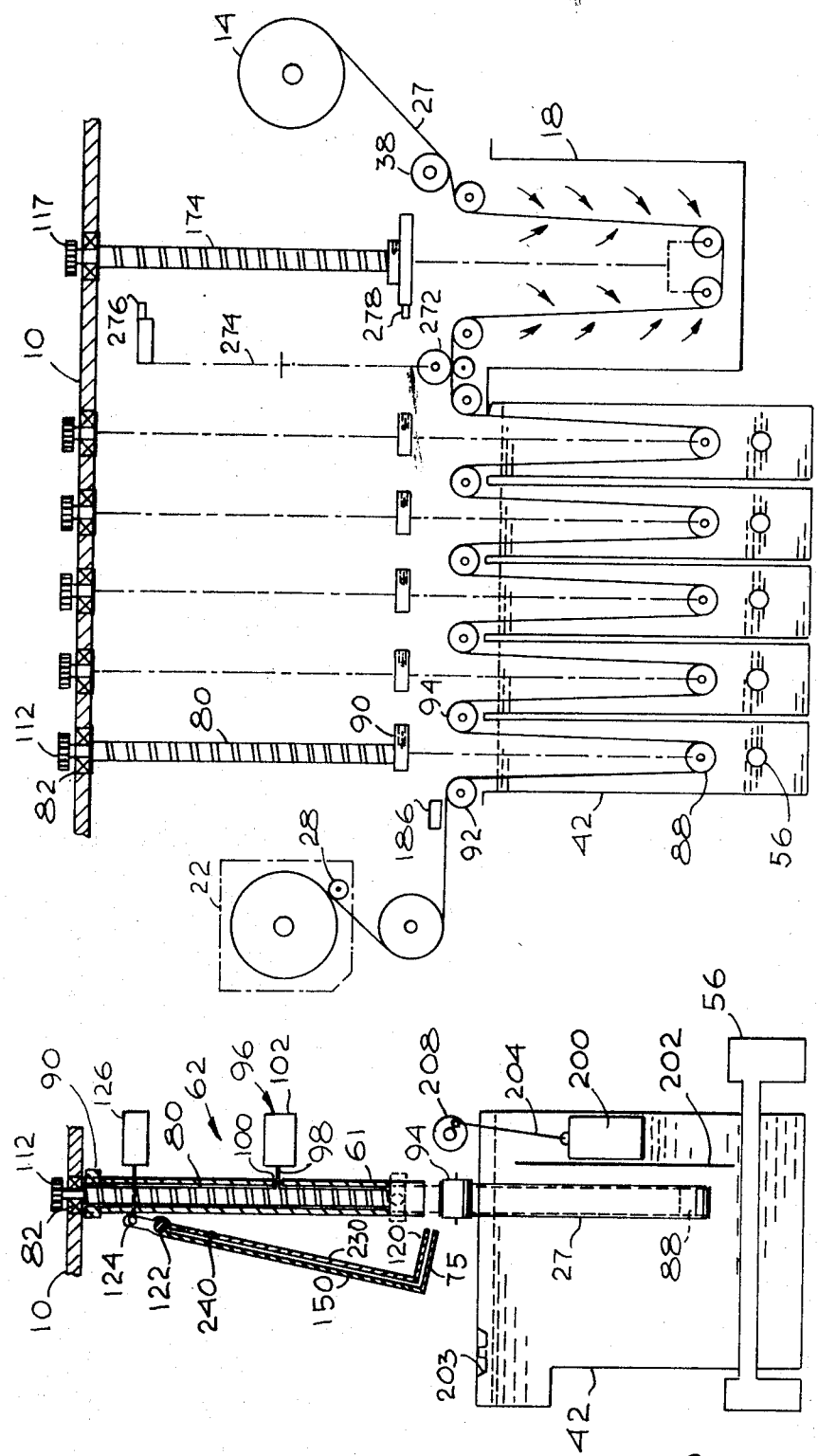

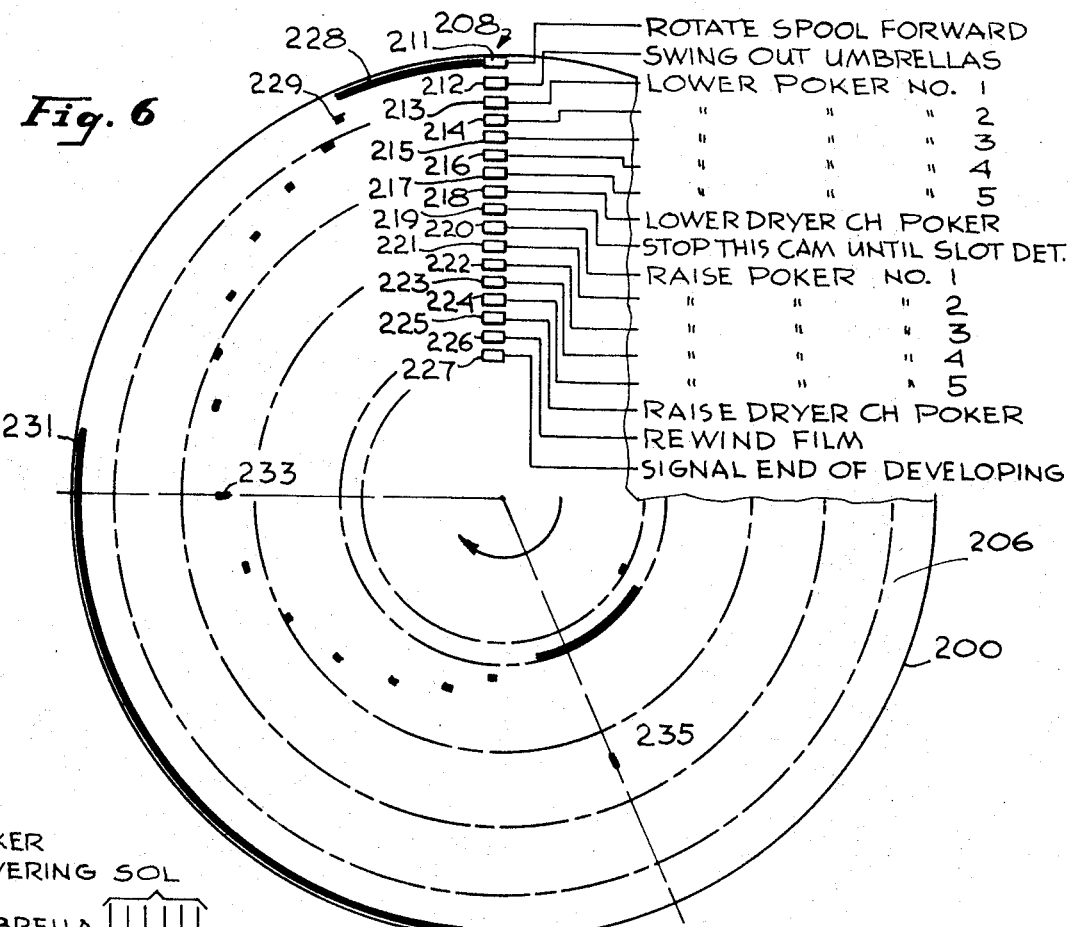
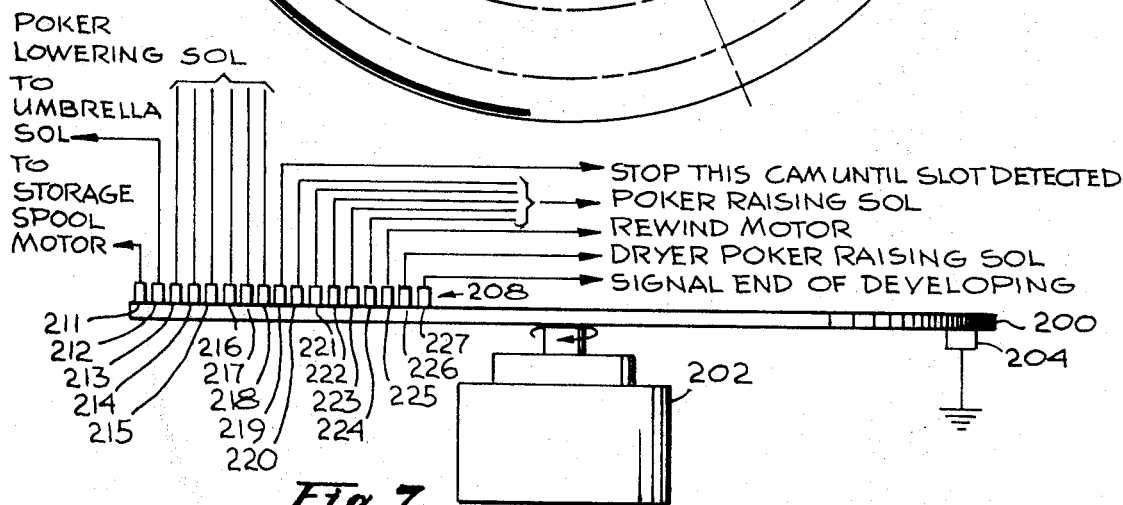
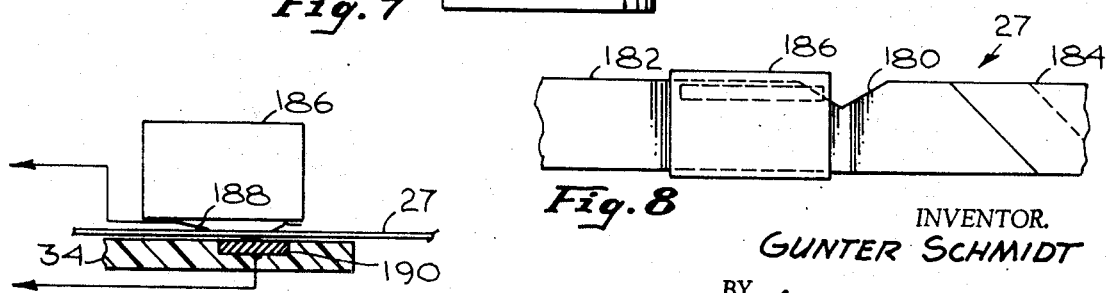

3,533,349

ROLL FILM PROCESSOR

BACKGROUND OF THE INVENTION

1. Field of the Invention

This invention relates to photographic film processing apparatus.

2. Description of the Prior Art

Prior art apparatus has generally required that film be detached from a magazine prior to or during processing. Such processing has generally been performed in specialized film laboratories due to the fact that the film handling prior to processing had to be performed in the dark. In addition, experienced operators are normally required to thread the film on the processing apparatus, control its movements through chemical tanks and dryers, and reattach it to a magazine for use. Also, prior art apparatus is generally bulky, requiring an entire room or a large portion of a room to hold it.

Although film processing can be performed at a moderate expense by a central specialized laboratory, the use of such a laboratory is somewhat unsatisfactory in that film records may not be available for several days and there may be a certain loss of security during this interval.

OBJECTS AND SUMMARY OF THE INVENTION

An object of the present invention is to provide a relatively simple and compact apparatus for automatically processing roll film.

Another object is to provide processing apparatus capable of processing film without detaching it from a magazine container.

In accordance with the present invention, a film processor is provided for use with roll film magazines of the type which have externally accessible hubs to enable rewinding of the film back into the magazine. The apparatus includes a film transport for pulling the film out of the magazine until only the inner end, which is anchored to the hub of the magazine, remains within the magazine. The film transport moves the film out of the magazine, through a series of tanks containing the processing solutions, and through a dryer section. The processing apparatus then rewinds the film into the magazine. The original magazine then contains the film which is now developed and ready for insertion into a film viewer.

In one embodiment of the invention, the film transport moves a leader at the forward end of the film to a storage spool, along a threading path that lies above a series of tanks and a dryer. The tanks hold the chemical solutions used in processing while the dryer is a chamber which receives heated air. A film threading guide extends like a bridge over the tanks to facilitate initial threading of the film. A series of pokers is held above the film threading path. As the inner end of the film leader is reached, the threading guide moves out of the way and the pokers push the film deep into each of the tanks and dryer chamber in a programmed sequence. The film moves slowly along the film path, so that all image-bearing film portions remain in contact with the solutions for a considerable time.

A blank trailing film section or after-leader is provided at the inner end of the roll so that all of the image-bearing film passes through the tanks, while part of the after-leader remains on the magazine hub. During the final stages of film withdrawal from the magazine, the pokers are all withdrawn from the tanks in a programmed sequence.

After the film is completely withdrawn from the magazine, except for the inner end which remains anchored to the hub, it must be rewound into the magazine. During rewind, the pokers are held above the film path. A pair of umbrella members are moved into positions between the pokers and film during rewind to catch drippings that fall from the pokers which have been withdrawn from the solution tanks.

The novel features of the invention are set forth with particularity in the appended claims. The invention will best be understood from the following description when read in conjunction with the accompanying drawings.

BRIEF DESCRIPTION OF THE DRAWINGS

FIG. 4 is a side sectional view taken on the line 4-4 of FIG. 3, showing in particular the umbrella apparatus of the invention;

FIG. 5 is a partial front elevation view of the apparatus of FIG. 1 during processing with the film completely immersed in all of the tanks;

FIG. 6 is a plan view of a timing cam circuit for sequencing the operations of the processor;

FIG. 7 is a side elevation view of the circuit of FIG. 6;

FIG. 8 is a plan view of a notch detector of the film processor; and

FIG. 9 is a side elevation view of the notch detector of FIG. 8.

DESCRIPTION OF THE PREFERRED EMBODIMENTS

Figure 1:
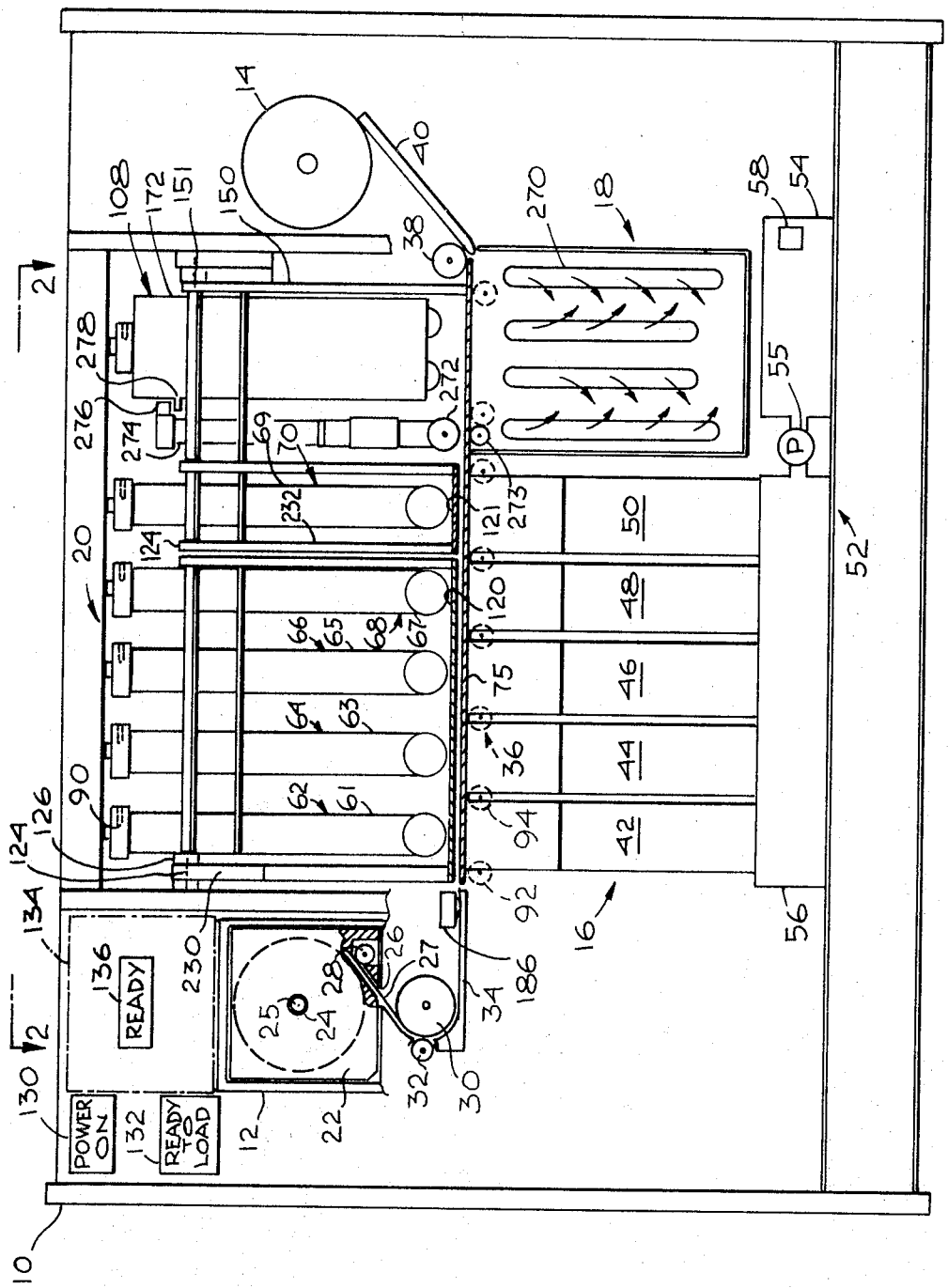
FIG. 1 is a front elevation view of a film processor constructed in accordance with the invention during the initial threading operation.

As shown in FIG. 1, the film processing apparatus comprises a main frame 10 which carries a magazine holder 12, in which a magazine of undeveloped film is placed for processing. A storage spool 14 is located on a side of the frame opposite the magazine holder, and film to be processed moves along a film path between the magazine holder and the storage spool. A series of tanks 16 positioned along the film path holds the solutions through which the film must pass in order to be developed. A dryer chamber 18 is located along the film path near the storage spool, for rapidly drying the film after it is developed. A series of poker assemblies 20 is located on a side of the film path opposite the tanks and dryer chamber. Pokers of the poker assemblies push the film down into the various tanks and the dryer chamber so that the film remains in each tank or chamber for a considerable time. After the film has been developed and dried, it is rewound into a film magazine on the magazine holder.

The magazine holder 12 is adapted to receive a film magazine 22 of a type which has an accessible central hub 24. The accessible hub is engaged by a motor driven rewind shaft 25 to enable rewinding of the film into the magazine. Such magazines are especially useful for holding microfilm records. The magazine is also of a type which includes a length of blank film or leader at the forward end of the film and a similar after-leader at the rearward or inner end. The inner end of the after-leader is preferably anchored to the hub so that it cannot be accidentally removed completely from the magazine. The forward end of the front leader protrudes into a slot 26 formed in the magazine to enable easy access. When the magazine is inserted into the film processor, a starting roller 28 engages the forward end of the leader 27. When the starting roller 28 is rotated, it pulls the leader out of the magazine and moves the front end to a position between a first drive roller 30 and a pinch roller 32. The leader is directed along a guide plate 34 to the area above the series of tanks 16.

The apparatus includes a film threading guide 75 which extends along the threading path. The threading guide 75 guides the leader along a straight line above the solution tanks and dryer chamber that extends between the guide plate 34 and a second drive roller 38. The roller 38 directs the film along a second guide plate 40 to the storage spool 14. The spool 14 engages the forward end of the film to start winding it. The threading guide 75 must be moved out of the way before the film is pushed into the tanks.

The series of tanks 16 includes first, second, third, fourth, and fifth tanks 42, 44, 46, 48, and 50. The first through fifth tanks generally hold solutions referred to as the developer, stopper, fixer, hypoeliminator, and washing solutions, respectively. The solutions generally must be at a precisely known temperature, inasmuch as the proper immersion time in each solution depends upon its temperature. In the present apparatus, a temperature somewhat above the warmest temperature which might be expected in an office or factory environment plus a temperature rise due to the operation of the motors of the film processor, is used. For example, a solution tank temperature of 110°F may be used. In order to maintain this temperature, a heat exchanger 52 is provided, which comprises a water heater tank 54 for holding water and heating elements, and a thermostat 58 for sensing the temperature of the water to control the energization of the heating elements. A water pump 55 pumps water from the tank into a manifold 56, and through conduits (not shown) in the solution tanks 42 through 50, to heat the processing solutions. The water then returns to the water heater tank 54.

In addition to maintaining the solutions at the proper temperature, they must be agitated. As shown in FIG. 4, a piston 200, located on one side of a partition 202 in tank 42, is used to agitate the solution. The partition separates the major portion of the tank, including the filling station 203, from the piston. The piston 200 is attached to a connecting rod 204, and one end of the connecting rod is pivotally connected off the center of a wheel 208. The wheel is driven by a motor, which drives other similar agitation apparatus located in the other solution tanks.

After the film has been started on the storage spool 14, poker rods of the poker assemblies 20 must be moved downwardly in order to cause the film to pass through the five solution tanks. The series of poker assemblies includes five assemblies 62, 64, 66, 68, and 70, each having one poker rod 61, 63, 65, 67, and 69, respectively, positioned above one of the five solution tanks. Another poker assembly 108 above the drying chamber 18 carries another poker rod 172. As shown in more detail in FIGS. 2 through 4, each poker assembly, such as assembly 62, comprises a spindle 80 with threads along its length. The spindle is rotatably mounted on a bearing 82, and the bearing is fixed to the frame 10. A sprocket wheel 112 is fixed to the upper end of the spindle, for engaging a driving chain that rotates the spindle.

The poker assembly 62 includes the poker rod 61 which comprises a tube that fits around the spindle. The rod 61 carries a dipping roller 88 at its lower end and a driving nut 90 at its upper end. When the spindle 80 rotates in one direction, the driving nut 90 may move the poker rod 61 downwardly. The dipping roller 88 at the bottom end of the poker rod then pushes the film 27 down into the tank 42. The poker rod remains in the downward position while the image-bearing film portion moves from the magazine 22 to the storage spool 14. This assures that the image-bearing film will remain within the tank solution a considerable time, in moving from a first guide roller 92 down to the bottom of the tank, around the dipping roller 88, and back up to a second guide roller 94. The other poker assemblies function in a similar manner to move the film a considerable distance through the tanks and dryer chamber.

As shown in FIG. 4, each poker assembly, such as the first one 62, includes an upper locking pin assembly 96 for maintaining the poker rod to which it is adjacent, in an upward position. This is to enable the retention of the poker rods in the upward position until they are released at a desired time. The locking pin assembly 96 comprises a pin 98 which fits into a hole 100 in the poker rod 61 to resist downward movement of the rod. The pin 98 is spring biased towards the poker rod, but can be withdrawn from the hole 100 by an electrically operated solenoid 102. If the pin 98 is withdrawn while the spindle 80 is rotating in the proper direction, the poker rod 61 moves down.

Figure 3:
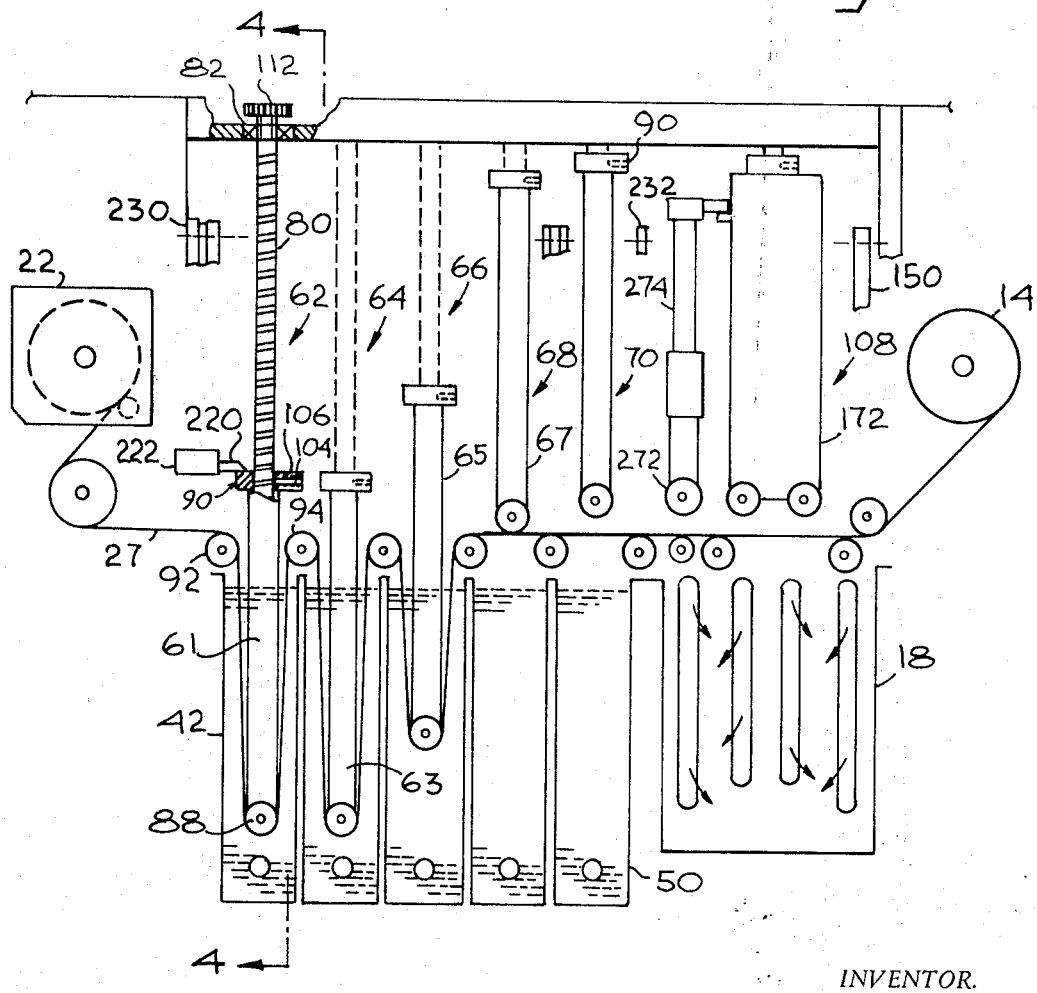
FIG. 3 is a partial front elevation view of the apparatus of FIG. 1 during the film immersion operation.

The driving nut 90 must be allowed to slip on the spindle 80 when the spindle is turning but the pin 98 is engaged in the hole 100. This is made possible by the construction of the driving nut. As shown in FIG. 3, the nut 90 is a smooth hollow tube which carries a driving pin 104. The driving pin is biased by a spring 106 towards the spindle to engage the spindle threads and move the poker rod up or down, depending upon the direction of rotation of the spindle. However, if the poker rod is held in the upward position by the locking pin assembly 96 or has traveled down as far as it can go, the driving pin can be pushed away by the threads to allow the nut to slip on the threads of the spindle.

The poker rod 61 is normally retained in its upper position, even though the spindle is rotating, until the locking pin assembly 96 releases it. The poker rod then moves steadily downward until it reaches the maximum downward position at which the driving nut 90 strikes a stopping portion of the frame. The driving nut then slips on the spindle threads. When the direction of spindle rotation is reversed, the poker rod 61 tends to move back up again. However, a spring-biased catch 220 retains the rod in the down position. A solenoid 222 can be energized to withdraw the catch and allow the poker rod 61 to move up when the spindle 80 is rotating in the reverse direction.

Figure 2:
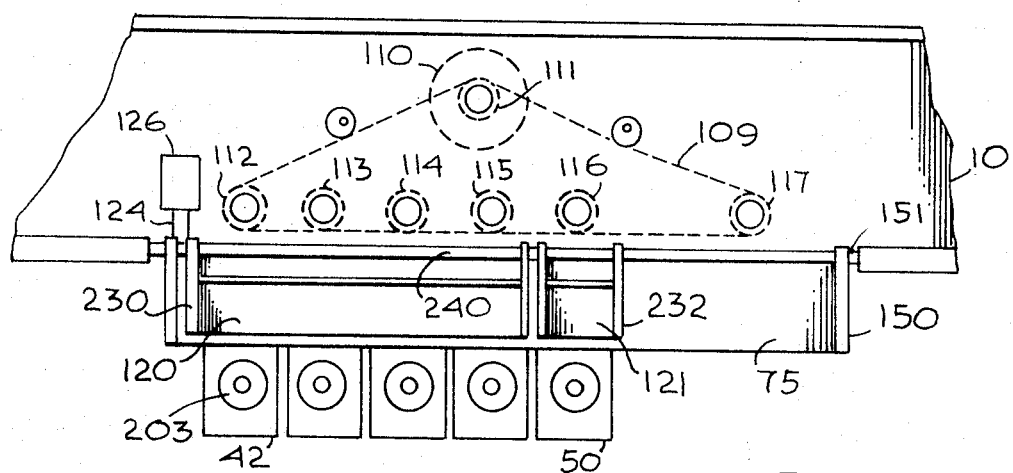
FIG. 2 is a plan view taken on the line 2-2 of FIG. 1.

The poker rods which are positioned over the solution tanks and drying chamber are all driven by a driving chain 109 shown in FIG. 2. The driving chain is driven by a motor 110, the motor rotating a sprocket wheel 111 that engages the chain 109. The chain extends about the sprocket wheel 111 of the motor and around six other sprocket wheels 112 through 117 attached to the spindles of the poker assemblies. The motor 110 can be reversed to move the poker rods up or down.

Two umbrellas 120 and 121 are provided to protect the developed film from drops of chemicals which might fall from the poker rods after they are withdrawn from the solution tanks. The first umbrella 120 can be positioned over the first four tanks 42, 44, 46, and 48, and the second umbrella can be positioned over the fifth tank 50. Umbrella levers 230 and 232 are connected to the umbrellas 120 and 121, respectively, to move them over or away from the tanks. As shown in FIG. 4, the upper end 124 of the first umbrella lever is pivotally connected to a solenoid 126. When the solenoid 126 is energized, it pulls the upper end 124 of the first umbrella lever, thereby moving the first umbrella 120 away from the film path.

A pin 240 engages the second umbrella lever 232 to move it away from the film path when the first umbrella lever is moved away. Catches (not shown) continue to hold the umbrella levers away from the film path. When the fourth poker rod 67 has moved back to its upward position, the catch which holds first umbrella lever 230 is automatically released. The catch which holds the second umbrella lever 232 is released when the fifth poker rod 69 has moved back to its upward position. When the catches are released, the umbrellas move over the film path.

A threading guide lever 150 which holds the threading guide 75 is pivoted at 151. The pin 240 on the first umbrella lever 230 engages the threading guide lever 150 to move it away from the film path when the first umbrella lever is moved away. The threading guide lever 150 is maintained away from the film path by a catch, (not shown) until the poker rod 172 of the dryer chamber is moved back up.

When the film has been threaded so it is started on the storage spool 14, the umbrella solenoid 126 is energized to move the two umbrella levers and the threading guide lever away from the film path. Then the poker rods can be moved downward into the solution tanks and dryer chamber. After the poker rods have moved the film down and the film has moved through the solution tanks and dryer chamber, the poker rods are moved upward to their original positions. When the first four poker rods 61, 63, 65, and 67 have returned to their upward positions, the film extends straight across the top of the first four tanks to the fifth tank 50. The first four poker rods then lie above the film which is now opposite the tanks. The first umbrella 120 is then released to move between the first four poker rods and the film portion underneath them. The film continues to move forward through the fifth tank 50 to wash off the previous solutions. The fifth poker rod 69 is then withdrawn, and the second umbrella is then released. Finally, the sixth poker rod 172 of the dryer chamber is moved up, and the threading guide 75 is released. After a limited additional forward movement of the film, it must be rewound. During rewind, all of the image-bearing film is protected against drippings from the five poker rods which have been withdrawn from the solution tanks, by the two umbrellas 120 and 121. The threading guide 75 assures that the front of the leader will not fall into the tanks.

The drying chamber 18 has four elongated slots 270 through which heated air is blown. A simple heater and blower arrangement (not shown) supplies the air. In order to facilitate drying, a chamois roller 272 is positioned in front of the dryer chamber along the film path, to wipe fluid from the film. The chamois roller presses the film against another chamois roller 273 to remove water spots from film prior to the film entering the dryer chamber. The roller 272 is mounted on a rod 274 which has a lifting bracket 276. A stop 278 on the dryer chamber poker rod 172 engages the lifting bracket 276 to lift the chamois roller away from the film when the dryer poker rod is in its upward position. This assures that the chamois roller will not interfere with the initial threading of the film.

In order to develop a magazine of film, the "power on" button 130, shown in FIG. 1, is pressed. This button then lights up. This starts the energization of the heating elements and pumps in the heat exchanger to warm up the processing solutions. When the temperature sensor 58 senses that the proper temperature has been reached, a "ready to load" sign 132 is illuminated. A magazine of exposed but undeveloped film is then placed in the magazine holder 12. The protective door shown in phantom lines at 134 is moved down to cover the magazine and shut out any light from the film as it is drawn from the magazine. A "ready" button 136 is then exposed and can be depressed to start the developing operation.

The first processing operation is the initial threading of the film along the film path to the storage spool 14. This is accomplished automatically in the manner described above, which involves the rotation of the starting roller 28, driver roller 30, second driver roller 38, and storage spool 14. The initial threading is accomplished while the poker rods are in their upward position, and the umbrella and threading guide levers 230, 232, and 150 are in place over the solution tanks. The next step is the energization of the umbrella solenoid 126 to move the umbrella and film guide levers out of the way. Then, the poker rods are moved down into the solution tanks and drying chamber. The storage spool 14 is rotated in a forward direction until most of of the length of image-bearing film has passed through all of the developing tanks.

In order to sense when the end of the image-bearing film has been reached so that rewind can soon begin, the after-trailer is provided with a cutaway portion in the form of a notch, or with some other position-indicating means, near its beginning. As shown in FIGS. 8 and 9, the notch 180 is formed in the after-trailer 182 near where it joins to the image-bearing film 184. The presence of the notch is sensed by a detector 186, comprising a spring contact 188 which can pass through the notch to a conductor 190 on the guide 34, to thereby complete an electrical circuit. When the presence of the notch is detected, a circuit is activated to raise the poker rods in sequence. The first four poker rods 61, 63, 65, and 67 are then raised to allow the film to lie above the first four tanks. During the raising of these poker rods, the film continues to move forward onto the storage spool 14, although it is not unwound from the film magazine.

When the fourth poker rod 67 reaches its upper position, it releases the catch which holds the first umbrella lever 230. The first umbrella 120 is then swung back over the first four tanks to prevent the dripping of any solution from the first four poker rods onto the film passing immediately over these tanks. An additional length of film is run through the last tank 50, which is filled with the washing solution. The plunger rod of the fifth plunger assembly 70 is then withdrawn so that film no longer enters the washing tank 50. As soon as the fifth plunger rod has reached its upper position, it releases the catch which holds the second umbrella lever 232, to move the second umbrella 121 over the fifth tank.

The storage spool 14 continues to rotate in a forward direction so that the portion of the after-trailer which has passed into the washing solution passes at least partially through the dryer chamber while the plunger rod therein is downward. The drying chamber poker rod 172 is then raised. When the rod reaches its upper position, it lifts the chamois roller 272 and also releases the catch which holds the threading guide lever 150. The threading guide 75 then moves over the tanks and dryer chamber. The direction of film motion can then be reversed to begin film rewind.

Rewind of the film back into the magazine continues until a notch in the leader, similar to the notch 180 in the after-leader, passes across the detector 186. When this notch is sensed, rewind continues for only a limited period. When the complete rewinding operation is completed, the protective door 134 can be lifted and the film magazine 22 removed. The film magazine 22 then contains the original film, which is now developed.

The poker rods can be lowered and raised in sequence, or all at the same time. Lowering and raising all or nearly all poker rods together necessitates long leaders and after-leaders on the film. The required length of the leader and after-leader can be shortened considerably by appropriate programming of the lowering and raising of the rollers and the turning of the storage spool 14. Then, a minimum length of leader equal to the distance between the first guide roller 36 and the storage spool 14 during initial threading plus a couple of turns on the storage spool is required.

The film processor is preferably operated by raising and lowering the poker rods in sequence to enable the use of short leaders and after-leaders. In this manner of operation, the storage spool 14 is held stationary so it ceases to turn as soon as the initial threading is completed. Then, only the first plunger assembly 62 is operated, and it operates at a speed which moves the poker rod 61 downwardly at half the speed at which film is generally moved along the film path by the storage spool during forward motion. This results in the unwinding of film from the film magazine 22 at the same rate as film is later unwound therefrom when all of the poker rods are down and only the storage spool 14 is turning. When the first poker rod 61 has reached its lowest position, the second poker rod 63 is released, and it travels down at the same rate as the first poker rod. The remaining poker rods of the other of the five tanks and of the dryer chamber are similarly released in sequence. FIG. 3 shows the operation during the lowering of the third poker rod 65 while FIG. 5 shows the apparatus with all of the poker rods in their downward positions.

When the dryer chamber poker rod 172 is in its downward position, the storage spool 14 is rotated in a forward direction again. The storage spool 14 continues to rotate until all of the image-bearing film portion has passed through all of the tanks and the dryer chamber 18. In the course of such movement, a point is reached when the notch in the after-leader is sensed, which occurs when the last portion of image-bearing film is within the first tank 42. When this point is reached, the poker rods are lifted in sequence, starting with the poker rod 61 in the first tank. The lifting occurs while the storage spool 14 continues to rotate in a forward direction and the hub of the film magazine is held stationary. The purpose of lifting the poker rods while the image-bearing film portion is passing through the processing tanks is to reduce the required length of the after-leader.

The poker rods are lifted at the same speed as they are lowered, which is one-half of the speed at which film is rolled onto the storage spool 14. During lifting of the poker rods, the hub 24 of the film magazine does not rotate. A hub brake may be applied to prevent any rotation. As in the lowering of the poker rods, the beginning of lifting of each poker rod begins as soon as the previous poker rod has reached nearly its full upward position, which is when it is beginning to leave the tank. After all of the image-bearing film has passed through all of the tanks and the dryer chamber, a shaft which engages the hub 24 of the film magazine 22 is rotated to rewind all of the film into the magazine. Finally, the magazine with the developed film can be removed.

FIGS. 6 and 7 illustrate a sequencing circuit for operating various components of the film processor. The sequencing circuit comprises a timing cam 200 which is rotated at a slow rate such as one revolution per hour by a gear head synchronous motor 202 mounted on the frame 10. The timing cam is constructed of a conductive material such as copper and is in continuous contact with an electrically grounded wiper 204. The upper surface 206 of the cam is covered with a nonconductive layer except at selected spots, such as at 228, indicated by dark markings thereon. At these spots, the wipers can make electrical contact with the conductive body of the cam. A group of wipers 208 comprising 17 wipers 211 through 227 determines the time and sequence of operation of the film processor.

The timing cam is in a starting position, shown in FIG. 6, when a new film magazine is inserted into the magazine holder and the processing begins. As the cam 200 rotates, the first wiper 211 makes electrical contact with the conductive body of the timing cam through spot 228, and is grounded. This allows current to flow through the storage spool motor to begin the initial threading operation. The conducting strip 228 is made long enough to assure film threading.

When the end of the initial threading strip 228 is reached, the wiper 212 contacts a conducting portion 229 on the timing cam. This allows current to flow through the umbrella solenoid 126 to swing out the two umbrellas and the initial film threading guide. Immediately thereafter, the contact 213 reaches a conducting portion on the cam, allowing current to flow through the blocking pin solenoid 102 to release the first poker rod and allow it to move downwardly. The other five poker rods are released in sequence as the contacts 214 through 218 reach a conductive portion of the timing cam. After the last poker rod has been lowered, the wiper 211 contacts a conducting portion 231 of the cam to continue to rotate the storage spool in a forward direction.

While the storage spool is moving the film forward, a wiper 219 contacts a conducting portion 233 which turns off the motor 202 which rotates the timing cam 200. The motor 202 is not energized again until the notch in the after-leader is detected. When the notch is reached, the motor 202 is energized again, and the cam rotates again. During the time when the timing cam 200 is not turning, the storage spool motor continues to rotate and move the film in the forward direction.

A short time after the after-leader notch is reached, contacts 220 through 225 reach conductive portions to release the hold down poker solenoids in sequence and raise the six pokers. Next, the wiper 226 reaches a conductive portion and operates the rewind motor which rotates the hub of the film magazine to rewind the film back into the magazine. After a limited rotation of the timing cam 200, the wiper 219 contacts a conductive portion 235 which causes deenergizing of the timing cam motor 202. The timing cam 200 stops rotating, but film rewind continues.

Near the end of film rewind, the notch in the leader, which is near the forward end of the film, is detected by the detector 186. This causes re-energization of the timing cam motor and rotation of the timing cam. After a limited period which is sufficient for the rest of the film to be rewound into the magazine, wiper 227 contacts a conductive portion to sound a bell or the like to indicate that processing is complete. The timing cam 200 continues to rotate until it again reaches the starting position shown in FIG. 6. The timing cam arrangement shown in FIGS. 6 and 7 is given merely as a simplified example. In many cases, greater reliability can be achieved with a series of cams that moves cam followers up and down to operate switches, instead of the timing cam shown in the figures.

Although particular embodiments of the invention have been described and illustrated herein, it is recognized that modifications and variations may readily occur to those skilled in the art, and, consequently, it is intended that the claims be interpreted to cover such modifications and equivalents.

I claim:

1. Apparatus for processing a length of film having an outer end and an inner end contained in a film magazine comprising:
    means for holding said film magazine;
    a plurality of tank means for holding processing solutions;
    means for drawing a portion of said film out of said magazine and through said tank means while said inner end remains within said magazine, said means for drawing including storage spool means, means defining a threading path which extends from said means for holding said magazine past said plurality of tank means to said storage spool means, poker means disposed on a side of said path opposite said tank means, means for moving said poker means across said threading path into said tank means after said film is started on said storage spool means, means for returning said poker means to a side of said threading path opposite said tank means;
    umbrella means;
    means for moving said umbrella means from a first position beneath said poker means when it is returned to catch drippings from said poker means and a second position spaced from said first position; and
    means for rewinding said film back into said magazine prior to the removal of said inner end from said magazine.

2. Apparatus as defined in claim 1 including:
    a dryer chamber;
    a poker rod disposed opposite said dryer chamber for enabling the movement of film along a film path portion lying between them; and
    means for moving said poker rod into said dryer chamber to establish a film path extending through said chamber.

3. Apparatus for processing film contained in a magazine comprising:
    magazine holding means;
    film storage means;
    means defining a threading path between said magazine holding means and said storage means;
    means for moving film from a magazine in said magazine holding means along said threading path to said storage means;
    a plurality of solution tanks disposed beneath said threading path;
    a plurality of poker rods;
    means for moving each of said poker rods between first positions, which are on a side of said threading path opposite said tanks, and second positions within said tank;
    threading guide means for guiding film along said threading path; and
    means for moving said threading guide means between a first location lying between said tanks and said first positions of said poker rods and a second location spaced from said first location.

4. Apparatus as defined in claim 3 wherein:
    said plurality of tanks is arranged in series so that film passing through a first of said tanks during movement from said magazine holding means thereafter passes through a second of said tanks; and
    said means for moving each of said poker rods includes sequencing means for beginning the movement of a second poker rod into said second tank after a first poker rod is substantially fully within said first tank.

5. Apparatus as defined in claim 4 wherein:
    said means for moving film moves it to said storage means at a predetermined speed; and
    said means for moving each of said poker rods moves said rods from said first to said second positions at substantially one-half said predetermined speed.

6. Apparatus as defined in claim 3 including:
    dryer chamber means for drying film, said dryer chamber means positioned on one side of said threading path and between said plurality of solution tanks and said storage means;
    a dryer chamber poker rod positioned on a side of said threading path opposite said dryer chamber means; and means for moving said dryer chamber poker rod into and out of said dryer chamber means across said threading path.

7. Apparatus as defined in claim 6 including:
wiper means disposed between said plurality of storage tanks and said dryer chamber means; and
means for moving said wiper means toward and away from said film.

8. Apparatus for processing film contained in a magazine comprising:
magazine holding means;
film storage means;
means defining a threading path between said magazine holding means and said storage means;
means for moving film from a magazine in said magazine holding means along said threading path to said storage means;
a plurality of solution tanks disposed beneath said threading path;
a plurality of poker rods;
means for moving each of said poker rods between first positions, which are on a side of said threading path opposite said tanks, and second positions within said tank;
rewinding means for moving film from said storage means back into said magazine;
umbrella means for movement between a first umbrella position wherein it lies between said initial threading path and said first position of said poker rods, and a second umbrella position spaced from said first umbrella position;
and means for moving said umbrella means to said first umbrella position at times when said poker rods are in said first position, to catch drippings from said poker rods.

9. Apparatus as defined in claim 3 wherein:
said means for moving film includes means for moving said film from said magazine holding means to said storage means while said poker rods are within said tanks;
drying means for drying said film;
rewind means for rewinding said film into said magazine; and
means for operating said rewind means prior to the withdrawal of all of said film out of said magazine.

10. Apparatus for processing film contained in a magazine comprising:
magazine holding means;
film storage means;
means defining a threading path between said magazine holding means and said storage means;
means for moving film from a magazine in said magazine holding means along said threading path to said storage means;
a plurality of solution tanks disposed beneath said threading path;
a plurality of poker rods;
means for moving each of said poker rods between first positions, which are on a side of said threading path opposite said tanks, and second positions within said tank;
said means for moving each of said poker rods comprises a spindle associated with one of said poker rods, said spindle having threads thereon;
means for rotating said spindle;
nut means for coupling said spindle threads to said poker rod, said nut means including means to enable slipping of said nut means on said spindle threads; and
locking means for selectively engaging said poker rod to retain it in one of said positions.

11. Apparatus as defined in claim 3 wherein:
said film includes position-indicating means spaced therealong; and including
detector means for detecting said position-indicating means;
rewinding means for moving said film back into said magazine holding means; and
means coupled to said detector means for activating said rewinding means.

12. Apparatus as defined claim 11 wherein:
said film includes an after-leader and said position indicating means includes a cut-away portion in said after-leader.